Nov. 3, 1942.　　O. E. WOOLDRIDGE　　2,300,720
CUSHION DRIVE COUPLING
Filed Aug. 7, 1940　　2 Sheets-Sheet 1
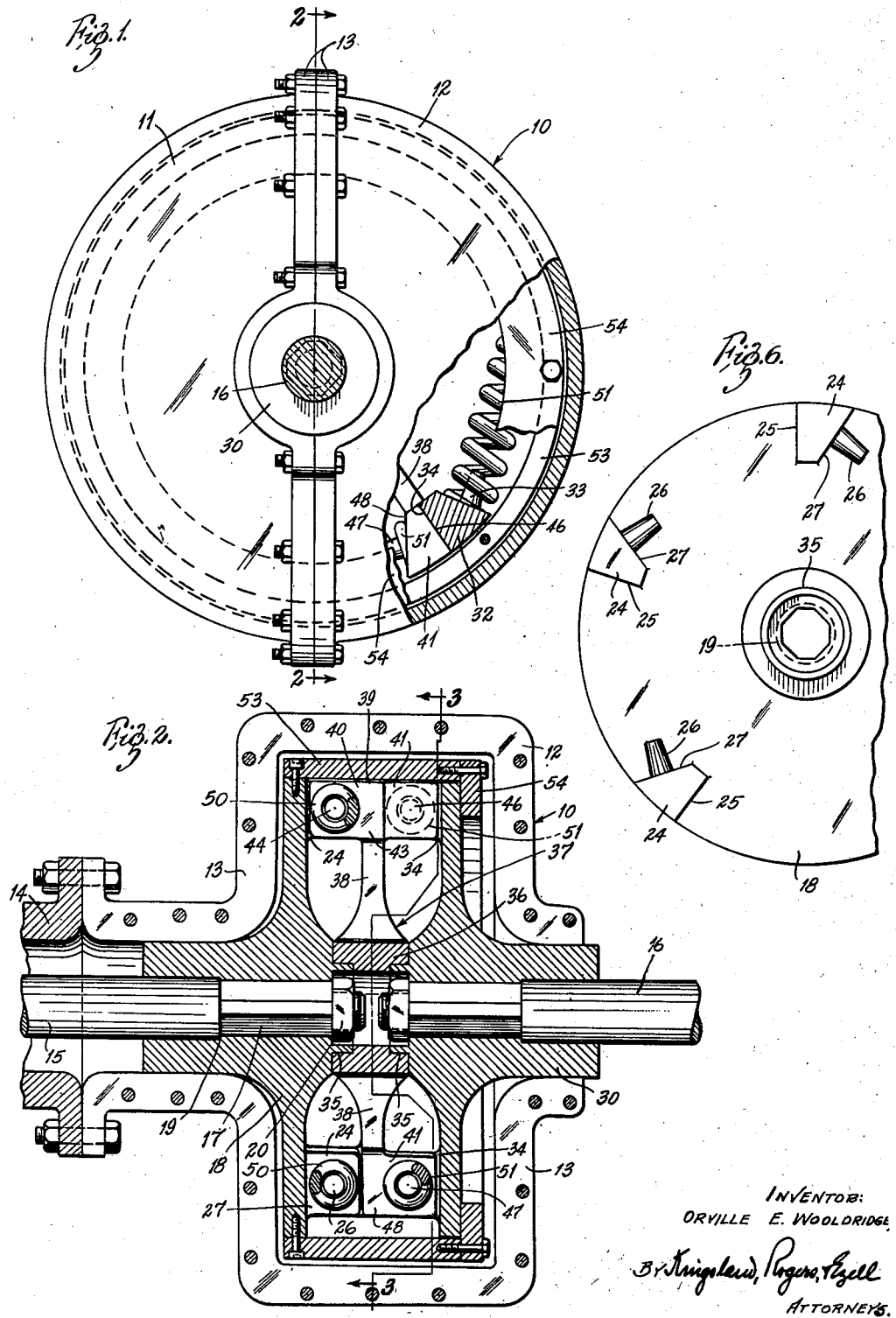
INVENTOR:
ORVILLE E. WOOLDRIDGE
By Kingsland, Rogers, Ezell
ATTORNEYS.

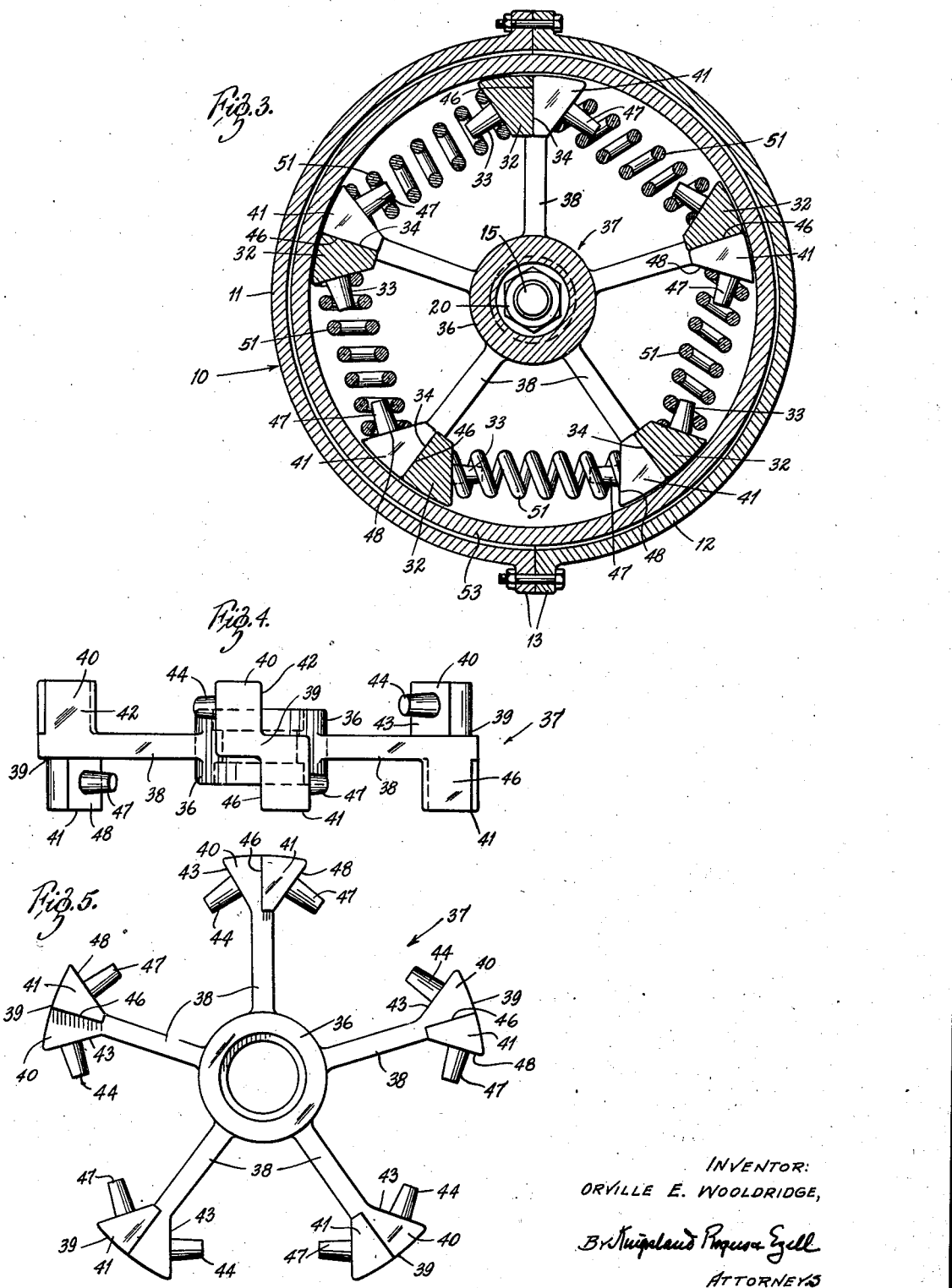

Patented Nov. 3, 1942

2,300,720

UNITED STATES PATENT OFFICE 2,300,720

CUSHION DRIVE COUPLING

Orville E. Wooldridge, Greenville, Ill.

Application August 7, 1940, Serial No. 351,736

3 Claims. (Cl. 64—27)

This invention relates to a cushion drive coupling adapted for use in connection with any power take-off mechanism such as an automobile motor and propeller shaft combination.

It has for its objects the provisions of a mechanism which is flexible where relative movement of the driving and driven members is in one direction and inflexible where relative movement is reversed, regardless of which is the driving and which the driven member.

A further object is to provide a mechanism of this kind having a middle member rotatable relative to the driving member and the driven member, and interposed between the two, with cushioning means between it and the two members for one direction of relative movement, and solid contact for the opposite, and to provide a sealed unit.

Fig. 1 is an end view of the device partly broken away;

Fig. 2 is a vertical section taken on the line 2—2 of Fig. 1;

Fig. 3 is a vertical broken section taken on the line 3—3 of Fig. 2;

Fig. 4 is an edge view of the following member;

Fig. 5 is a side view thereof; and,

Fig. 6 is a side view of part of one of the power members.

The device includes a housing 10 preferably generally circular, and formed of two semi-circular elements 11 and 12 joined together by means of flanges 13 through which extend suitable bolts. The housing may be supported as shown in Fig. 2 on such means as the torque tube 14. It is not a requisite in all installations.

The mechanism is symmetrical and either end is a driving member and the other end a driven member. For present purposes, we will assume that the shaft 15 is the drive shaft and the shaft 16 is the driven shaft. These shafts penetrate the housing from opposite sides. The shaft 15 has a non-circular portion 17 to hold against rotation a rotating disc 18 mounted thereon. A shoulder 19 limits endwise movement of the rotor, and a nut 20 threaded over the end of the shaft holds the rotor securely against the shoulder.

The rotor 18 has a series of enlarged heads 24 extending from its inner surface at its periphery, each having a radial back surface 25 and a tapered boss 26 on the side opposite the surface 25. Each boss 26 extends at a slight angle, such as 1½°, outwardly from a chordal direction between the particular head and the cooperating head to be described. Each boss 26 projects from a surface 27 on the head 25 that is normal to the axis of the boss.

The other rotary disc 30 is similarly mounted on the shaft 16. It has on its inner face at the periphery heads 32 with tapered bosses 33 and radial surfaces 34. When viewed from either end of the mechanism, the heads 24 and 32 appear to face in the same direction.

Each of the rotors has an annular bearing surface 35 formed with a shoulder. On these bearing surfaces is mounted the hub 36 of a floating member 37 which thereby is journalled upon the two hubs 18 and rotatable relative thereto. The hub 36 has a plurality of arms 38 corresponding in number to the head on each of the hubs 18 and 30. Each arm has a head 39 on its outer end. Each head consists of two portions 40 and 41 oppositely arranged, but symmetrical. The head portion 40 projects laterally to one side of the disc plane of the floating member and the head 41 to the opposite side. The head portion 40 has a back surface 42 extending in a radial direction and an opposite surface 43 from which projects a tapered boss 44. The boss 44 extends in a generally chordal direction relative to an adjacent arm but at a slightly outward angle, and the surface 43 is normal thereto.

The head portion 41 has a corresponding radial surface 46, a corresponding boss 47 and a corresponding surface 48.

When the floating member is in position between the two hubs 18 and 30, the heads 24 of the driving member 18 will project toward the corresponding heads 40 on the floating member, and the heads 41 on the floating member will project toward the corresponding heads 32 on the driven member. Between the heads 24 on the driving member and the corresponding heads 40 on the floating member are suitable stiff coil springs 50 engaged over the bosses 26 and 44 under some compression, projecting from the heads, and resting against the normal surfaces 27 and 43. Likewise, between the heads 41 on the floating member and corresponding heads 32 on the driving member are located similar springs 51. These springs are strong enough not to be compressed to their limits upon application of load.

The driving and driven members are held together in fixed spaced relationship by a cylindrical member 53 secured and sealed to an edge of the member 18 and projecting over and slightly beyond the radial limits of the corresponding edge of the other member 30. The free edge of this cylindrical member 53 has secured thereto a ring 54 that extends down over and seals against the face of the driven member 30. This arrangement prevents axial displacement of the three members. It also encloses the coupling to contain a heavy lubricant.

When a force is applied to rotate the driving member in a clockwise direction viewed from the left of Fig. 2 and therefore in a counterclockwise direction in Fig. 3, the head 24 will move to compress the springs 50 which, in turn, act upon the heads 40 of the floating member. These heads will rotate after their resistance is overcome, carrying the heads 41, which then compress the springs 51 between them and the heads 32 of the driven member 30. When the total resistance of the driven member is overcome by the force in and through the springs, the driven member will rotate. When the springs are compressed, the taper on the bosses and their outwardly extending location, will in an adequate degree take care of the fact that as the bosses approach they turn inwardly relative to the springs.

When the driving member 18 rotates in the opposite direction, the surfaces 25 on the heads 24 will act directly against the surfaces 42 on the heads 40, to move positively the floating member 31. Likewise, the surfaces 46 on the heads 41 of the floating member will act against the surfaces 34 on the driven member and positively displace it. By this means the drive is positive in one direction, but flexible in the other.

It will be seen that the operation is the same whichever element is the driving element. In either case, the rotation in one direction is flexible and in the other direction is positive. By this means the device may be used for positive drive for normal operation with the flexible drive to absorb back-lash, or it may be used for flexible forward drive and positive reverse.

In the type shown, the floating member 31 has its heads 40 and 41 extending in opposite directions, as also do its two positive contact surfaces 42 and 46. A reversal of this situation would have the heads on the floating member extend both in the same direction and with the positive contact surfaces lying side by side. The obvious corresponding change of the driving and driven members will cause the mechanism to drive flexibly in both directions. In such case, when the driving member 18 rotates, its heads 24 will move to compress the springs 50 which will act upon the heads 40 of the floating member. These heads will have their surfaces 46 against corresponding surfaces of the driven member 30 directly to transmit the movement of the floating member thereto. Upon reversal of force of the driving member its surface 25 will directly abut the surface 42 of the floating member positively to drive the floating member. However, with this modification, the floating members will then compress the springs 51 which act upon the heads 32 of the driven member and cause it to be displaced.

It is, of course, in the scope of the invention to reverse the positions of the members and thereby reverse the normal directions of operations. Other resilient means may be substituted for the springs, as is obvious, such as hydraulic devices.

What is claimed is:

1. In a mechanism of the kind described, a main rotatable driving member, a main rotatable driven member, and a floating member between them, projections on the driving member having front and rear faces, projections on the driven member having front and rear faces, and two sets of projections on the floating member, the first set each having a front face directed toward each front face of the projections on the driving member, resilient means between said front faces, and said first set having rear faces directed toward and adapted to contact with the rear faces of the driving member projections, and the second set of projections on the floating member each having a front face directed toward each front face of the driven member with resilient means therebetween, and rear faces directed toward and adapted to contact with the rear faces on the projections on the driven member.

2. In a mechanism of the kind described, a main rotatable driving member, a main rotatable driven member, and a floating member, said driving member and said driven member being axially spaced with the floating member between the main members and rotatable relatively to both, projections on the driving member extending toward the driven member, projections on the driven member extending toward, but not to, the previous projections, each projection having a radial back face and a front face, the floating member having two sets of projections, one set extending toward those on each main member to be in rotatable alignment therewith, and each including a radial rear face adapted to abut the corresponding radial rear face of each of the respective main member projections, and a front face toward the corresponding front face of each of the respective main member projections, and resilient means between each facing pair of front faces.

3. In a mechanism of the kind described, a rotatable driving member, a rotatable driven member, and a floating member between them and rotatable relative to both, a plurality of heads on the driving member, a plurality of heads on the driven member, and heads on the floating member disposed to cooperate with the heads of both the driving and driven members, the heads on all members having both spring-receiving surfaces and direct contact surfaces, the heads on the driving member and the corresponding heads on the floating member having their direct contact surfaces disposed to come together, and said contact surfaces being complementary to give surface contact for positive drive of the floating member in one direction of rotation, and the heads on the driving member and the heads on the floating member opposite said direct contact surfaces having cushion-receiving seats, cushion means disposed between said cushion-receiving seats, whereby drive between the driving member and floating member in the other direction may be resilient, a driven member, and heads on the driven member adapted to cooperate with the heads on the floating member to transmit motion from the floating member to the driven member, and to apply motion to the floating member.

ORVILLE E. WOOLDRIDGE.